United States Patent
Eisele et al.

(10) Patent No.: US 12,139,124 B2
(45) Date of Patent: Nov. 12, 2024

(54) METHOD AND DEVICE FOR OPERATING A BRAKE SYSTEM, COMPUTER PROGRAM AND COMPUTER PROGRAM PRODUCT, BRAKE SYSTEM

(71) Applicant: Robert Bosch GmbH, Stuttgart (DE)

(72) Inventors: Achim Eisele, Hessigheim (DE); Andreas Klug, Untergruppenbach (DE); Jan Becker, Backnang (DE); Matthias Kranich, Grossbottwar (DE); Philipp Weingart, Heilbronn (DE); Andreas Zoebele, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 303 days.

(21) Appl. No.: 17/617,344

(22) PCT Filed: May 7, 2020

(86) PCT No.: PCT/EP2020/062709
§ 371 (c)(1),
(2) Date: Dec. 8, 2021

(87) PCT Pub. No.: WO2021/008751
PCT Pub. Date: Jan. 21, 2021

(65) Prior Publication Data
US 2022/0250595 A1    Aug. 11, 2022

(30) Foreign Application Priority Data
Jul. 18, 2019    (DE) .................... 10 2019 210 670.6

(51) Int. Cl.
*B60T 8/1755*    (2006.01)

(52) U.S. Cl.
CPC ....... *B60T 8/17551* (2013.01); *B60T 2230/04* (2013.01); *B60T 2240/06* (2013.01); *B60T 2250/00* (2013.01); *B60T 2270/86* (2013.01)

(58) Field of Classification Search
None
See application file for complete search history.

(56) References Cited

U.S. PATENT DOCUMENTS 5,408,411 A * 4/1995 Nakamura .......... B60T 8/17551
                                                                701/48
5,772,289 A    6/1998 Nakazawa et al.
(Continued)

FOREIGN PATENT DOCUMENTS

CN    103153728 A    6/2013
CN    104180818 A * 12/2014 ............. G01C 21/26
(Continued)

OTHER PUBLICATIONS

English translation of description of CN-104180818-A (Year: 2014).*
(Continued)

*Primary Examiner* — Amelia Vorce
(74) *Attorney, Agent, or Firm* — NORTON ROSE FULBRIGHT US LLP; Gerard A. Messina

(57) ABSTRACT

A method for operating a brake system of a motor vehicle. The motor vehicle has a vehicle body and multiple wheels mounted relative to the vehicle body by a wheel suspension on the vehicle body. The vehicle body is capable of executing a pitching movement by the wheel suspension. The brake system has a wheel-individual wheel brake for at least some of the wheels. A pitch angle of the vehicle body is monitored, and the wheel brakes are actuated as a function of the acquired pitch angle. The pitch angle is calculated as a function of normal forces acting on the wheels.

12 Claims, 3 Drawing Sheets

(56) References Cited

U.S. PATENT DOCUMENTS

| | | | |
|---|---|---|---|
| 10,108,197 B2 * | 10/2018 | Lauffer | B60W 30/18 |
| 2007/0106442 A1 | 5/2007 | Lu | |
| 2010/0168975 A1 * | 7/2010 | Takahara | B60T 8/1766 |
| | | | 701/70 |
| 2017/0120901 A1 * | 5/2017 | Igari | B60W 40/11 |
| 2018/0037082 A1 * | 2/2018 | Unger | B60G 17/01908 |
| 2018/0126981 A1 * | 5/2018 | Gangwar | G05D 1/0891 |
| 2018/0147908 A1 * | 5/2018 | Kameda | B60G 17/0182 |
| 2019/0211529 A1 * | 7/2019 | Vigholm | B60T 8/36 |

FOREIGN PATENT DOCUMENTS

| | | | | |
|---|---|---|---|---|
| CN | 108099535 A | | 6/2018 | |
| CN | 112533804 A | * | 3/2021 | B60T 8/172 |
| DE | 102004053236 A1 | * | 5/2006 | B60G 17/018 |
| DE | 102005018834 A1 | * | 10/2006 | G01S 1/68 |
| DE | 102005028995 A1 | * | 1/2007 | B60T 8/1706 |
| DE | 102013217109 A1 | | 3/2015 | |
| DE | 102014220869 A1 | * | 4/2015 | B60L 15/2009 |
| DE | 102015002603 A1 | | 9/2016 | |
| DE | 102015010400 A1 | * | 2/2017 | B60T 8/172 |
| EP | 3037309 A1 | * | 6/2016 | B60T 8/1755 |
| JP | 5533405 B2 | * | 6/2014 | B60W 40/11 |
| KR | 20180016458 A | * | 2/2018 | B60W 40/11 |
| WO | WO-2013005903 A1 | * | 1/2013 | B60G 17/06 |
| WO | WO-2019233687 A1 | * | 12/2019 | B60K 35/00 |
| WO | WO-2020039751 A1 | * | 2/2020 | B60T 8/172 |

OTHER PUBLICATIONS

English translation of description of WO-2019233687-A1 (Year: 2019).*

© Springer-Verlag GmbH Deutschland 2018, D. Schramm et al., Vehicle Dynamics (Year: 2018).*

International Search Report for PCT/EP2020/062709, Issued Jul. 27, 2020.

* cited by examiner

METHOD AND DEVICE FOR OPERATING A BRAKE SYSTEM, COMPUTER PROGRAM AND COMPUTER PROGRAM PRODUCT, BRAKE SYSTEM

FIELD

The present invention relates to a method for operating a brake system of a motor vehicle, the motor vehicle having a vehicle body and multiple wheels mounted relative to the vehicle body by a wheel suspension on the vehicle body, the vehicle body being capable of executing a pitching movement with the aid of the wheel suspension, and the brake system having a wheel-individual wheel brake for at least some or at least two of the wheels, and a pitch angle of the vehicle body is monitored and the wheel brakes are actuated as a function of the detected pitch angle.

In addition, the present invention relates to a device for operating such a brake system and to a corresponding brake system. The present invention moreover relates to a computer program and a computer program product.

BACKGROUND INFORMATION

Methods of the type mentioned in the introduction are described in the related art. For reasons of safety and comfort, the wheels of a motor vehicle can usually move relative to the vehicle body of the motor vehicle. This movement is ensured by a wheel suspension which, for example, is developed as an independent wheel suspension so that each wheel has its own mounting spring and its own bearing damper, which acts between the wheel and the vehicle body. Depending on the development of the wheel suspension, the pitching behavior of the motor vehicle is affected during an acceleration or deceleration. A pitching movement especially refers to a movement of the vehicle body by which the vehicle body pivots about a horizontal axis, in particular the pitch axis, that particularly runs through its center of gravity and is aligned transversely to the driving direction. During braking operations that are influenced or executed by an automated braking intervention in an effort to improve the braking effect and/or to ensure the driving safety, the potentially deliverable braking power per wheel varies on account of the pitching behavior of the motor vehicle. Especially at the start of such a braking operation, the potentially deliverable braking power may change considerably.

To take this into account, it is conventional to consider the pitching behavior of the vehicle body in the form of a characteristic curve. However, this characteristic curve generally covers only a special driving situation and is therefore not always readily transferable to other driving situations.

SUMMARY

A method according to the present invention may have the advantage of providing a possibility for an optimal actuation of the wheel brakes as a function of the pitching behavior of the vehicle body and independently of a current driving situation of the motor vehicle. This optimizes the braking effect or braking power. The method according to an example embodiment of the present invention ascertains and calculates forces that are acting on the vehicle in a manner that is independent of the situation so that the maximally deliverable braking power is maximized. To this end, the present invention provides for the calculation of normal forces that are acting on the wheels as a function of the pitch angle. The maximally possible braking moment or the maximally possible braking power acting between the wheel and the road is able to be determined as a function of the calculated normal forces and can be correspondingly adjusted by the respective wheel brake.

The pitch angle is particularly ascertained with the aid of a programmed model, in particular a single-track model. This allows for a continuous onboard calculation of the pitch angle so that the behavior of the vehicle body is monitored in an advantageous manner. Moreover, it is preferably provided that the model takes vertical translation movements and rotary movements of the vehicle body into account. The model particularly detects superposed translation movements and rotary movements and considers them when calculating the normal forces. This advantageously ensures a wheel-individual normal force calculation.

Taken into account in particular is at least one braking torque compensation factor as a function of the wheel suspension. The braking torque compensation factor results from the constructive development of the wheel suspension itself and takes into account, for instance, the movement path of the wheel when the vehicle body is compressed relative to the vehicle body.

In order to determine the vertical translation movement, i.e., the vertical compression of the total vehicle body in the center of gravity, vertical dynamics in the center of gravity of the vehicle body are preferably ascertained. The dynamics are acquired with the aid of an inertial sensor or multiple inertial sensors, for instance. The vehicle body particularly has at least one inertial sensor and/or acceleration sensor. To this end, the acceleration of the vehicle body in the center of gravity, in particular, is calculated with the aid of the vertical forces between the vehicle body and the wheel, the vertical forces initially in particular being assumed as a known variable from a calculation cycle, in particular the directly preceding calculation cycle. Through an integration, the speed of the vehicle body preferably is ascertained, and the compression travel of the vehicle body in the center of gravity is obtained by a further integration.

As a function of the ascertained vertical dynamics and with the aid of a calculation of the principle of the angular momentum, a pitching dynamics in the center of gravity of the vehicle body is preferably ascertained as a function of the braking forces acting between the wheels and the road. To determine the pitch dynamics, the moment balance is preferably set up via the spin behavior of the vehicle body. Using this calculation of the principle of the angular momentum, the angular acceleration is ascertained with the aid of a differential equation. The variables required for this purpose, e.g., the braking forces in the longitudinal direction, are already known or ascertained. The also required vertical forces between the vehicle body and the wheel are initially assumed as known variables from a calculation cycle, especially the directly preceding calculation cycle. Similar to the vertical velocity, the angular velocity is obtained by an integration of the angular acceleration, and the pitch angle is obtained by a further integration.

The vertical dynamics are transformed to wheel-individual compression travels of the wheel suspension. preferably as a function of the ascertained pitching dynamics. With knowledge of the pitch angle, the transformation of the compression travel in the center of gravity is thereby transformed to the spring travels at the wheels or axles. The respective wheel-individual compression spring rate is preferably also determined in this manner.

According to one preferred further refinement of the present invention, wheel-individual vertical forces between the wheel and the vehicle body are calculated as a function of the compression travels, wheel-individual spring forces and damper forces. Especially the damper constant and damper force of the wheel suspension as well as the spring constant and spring force at the respective wheel are taken into account in the process.

Next, the wheel-individual normal forces are calculated as a function of the vertical forces under consideration of the respective wheel mass. They then form the basis for the determination of the braking forces, as already described in the previous text.

The computer program according to an example embodiment of the present invention carries out all the steps of the method according to the present invention when it is executed on a computer. This results in the already mentioned advantages.

The computer program product according to an example embodiment of the present invention includes the computer program according to the invention stored or deposited on a machine-readable memory medium.

The device according to an example embodiment of the present invention includes a control unit, which is specifically set up for carrying out the method according to the present invention. In particular, the control unit is designed to carry out the computer program according to the present invention, which is preferably stored on a non-volatile memory of the control unit. As an alternative, the control unit preferably has a reading option for the computer program product according to the present invention.

An example embodiment of the present invention is a brake system for a motor vehicle, where the motor vehicle has a vehicle body and multiple wheels mounted relative to the vehicle body by a wheel suspension on the vehicle body, the vehicle body being capable of executing a pitching movement by the wheel suspension. The brake system has a wheel-individual wheel brake for at least some of the wheels and has a device for operating the motor vehicle, the device including a control unit designed to carry out a method in which a pitch angle of the vehicle body is monitored and the wheel brakes are actuated as a function of the acquired pitch angle ($\varphi$), which is calculated as a function of normal forces ($F_N$) acting on the wheels. In an example of this embodiment of the present invention, the pitch angle ($\varphi$) is ascertained with the aid of a programmed model, in particular a one-track model. In an example of this embodiment, the model takes vertical translation movements and rotary movements of the vehicle body into account. In an example, at least one braking torque compensation factor ($k_{Mbr}$) as a function of the wheel suspension is taken into account. In an example of the embodiment, vertical dynamics in the center of gravity of the vehicle body are ascertained in order to determine the vertical translation movement. In an example of the embodiment, with aid of the ascertained vertical dynamics and of a calculation of a principle of the angular acceleration, a pitching dynamics in the center of gravity of the vehicle body is ascertained as a function of braking forces ($F_x$) acting at the wheels in the driving direction. In an example of the embodiment, the vertical dynamics are transformed to wheel-individual compression travels of the wheel suspension as a function of the ascertained pitch dynamics. In an example of the embodiment, wheel-individual vertical forces between the respective wheel and the vehicle body are calculated as a function of the compression travels, a wheel-individual spring force, and damper force. In an example of the embodiment, wheel-individual normal forces are calculated as a function of the verical forces under consideration of the respective wheel mass. This results in the already mentioned advantages.

Additional advantages and preferred features and feature combinations are in particular obtained from the previously described matter.

Below, the present invention is described in greater detail based on the figures.

DETAILED DESCRIPTION OF EXAMPLE EMBODIMENTS

Figure 1A:
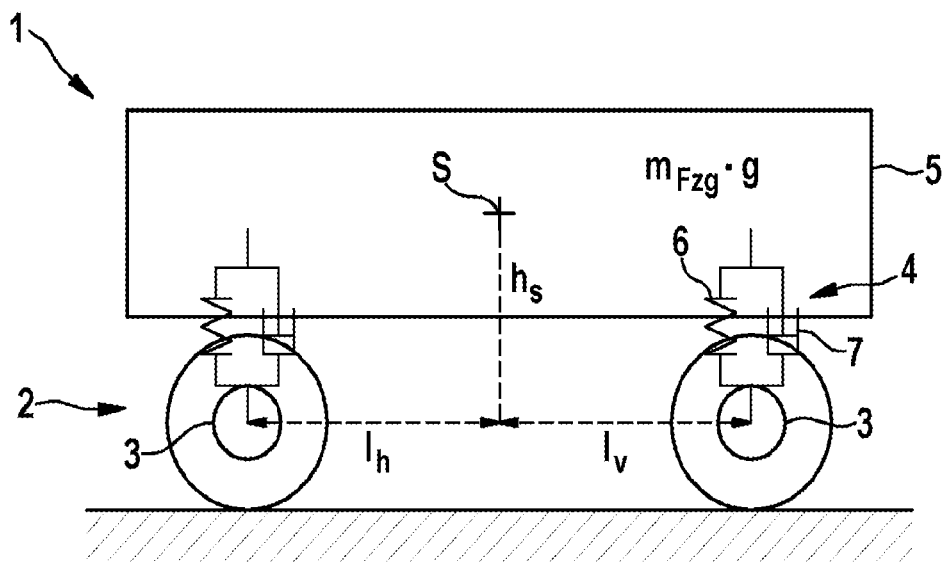
FIGS. 1A to 1C show a simplified representation of a vehicle dynamics of a motor vehicle.
Figure 1B:
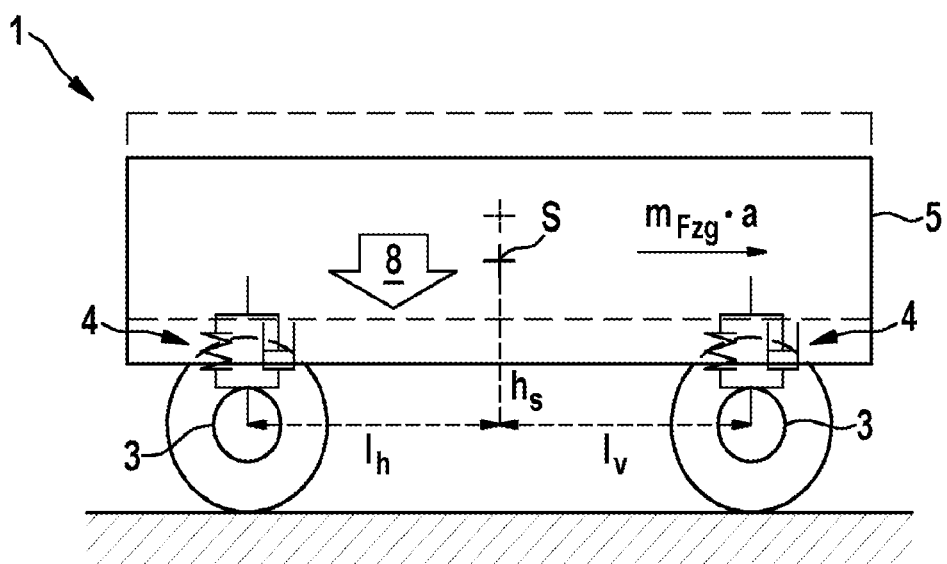
Figure 1C:
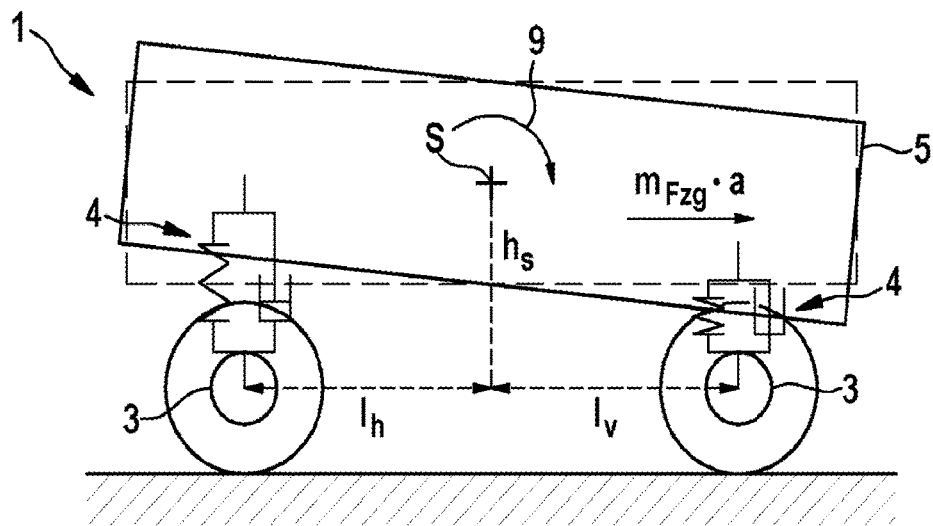

In a simplified representation, FIGS. 1A to 1C show a motor vehicle 1 having a brake system 2, which has an individually actuable wheel brake 3 for each wheel of the motor vehicle. The wheels are individually mounted on a vehicle body 5 of the motor vehicle by a wheel suspension 4 so that the wheels are able to move relative to the vehicle body independently of one another. A booster spring 6 and a damper 7, which jointly form a spring damper system of wheel suspension 4 for the respective wheel, are assigned to each wheel through wheel suspension 4. The center of gravity of the motor vehicle is denoted by S, and the mass of motor vehicle 1 by $m_{Fzg}$. In the idle state of motor vehicle 1 as shown in FIG. 1A, the center of gravity S lies at a height $h_S$ above the axes of rotation of wheels 3 and at a vertical distance $l_h$ to a wheel positioned in the rear in the driving direction and at a distance $l_v$ from a wheel positioned in the front in the driving direction.

FIG. 1B shows motor vehicle 1 in a second state in which vehicle body 5 is compressed in the direction of the road surface or the wheels, which means that distance $h_s$ is reduced. Because this involves a purely vertical movement, wheel suspension 4 is compressed to the same extent at both wheels 3. Wheel springs 6 and dampers 7 are loaded to equal degrees at the front and back or at all wheels.

FIG. 1C shows motor vehicle 1 in a state in which vehicle body 5 executes a pitching movement, as indicated by arrow 9. During the pitching movement, vehicle body 5 pivots about a horizontal axis that extends through center of gravity S and is aligned transversely to the driving direction. In the exemplary embodiment illustrated in FIG. 1C, the pitching movement occurs because of a braking intervention that decelerates motor vehicle 1. Due to the deceleration, vehicle body 5 pivots in the downward direction at its front end and in an upward direction at its rear end.

Figure 2:
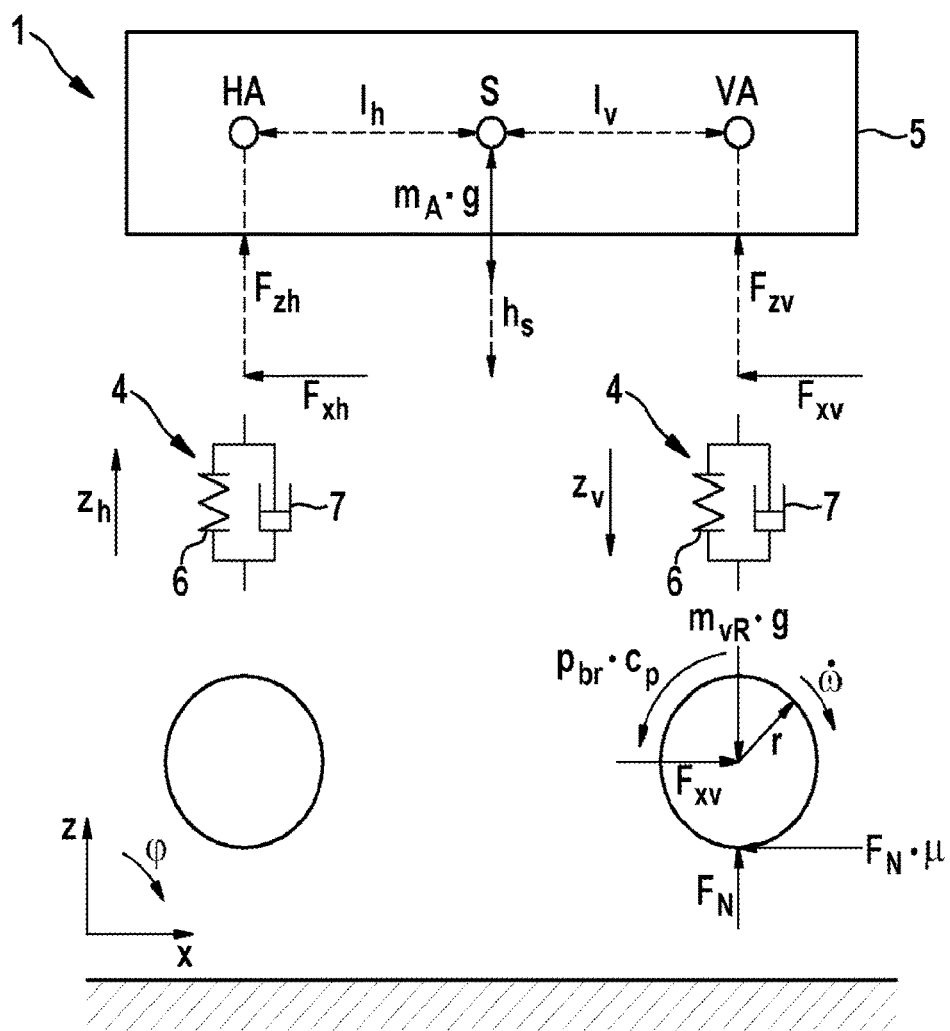
FIG. 2 shows a simplified physical model of the motor vehicle.
Figure 3:
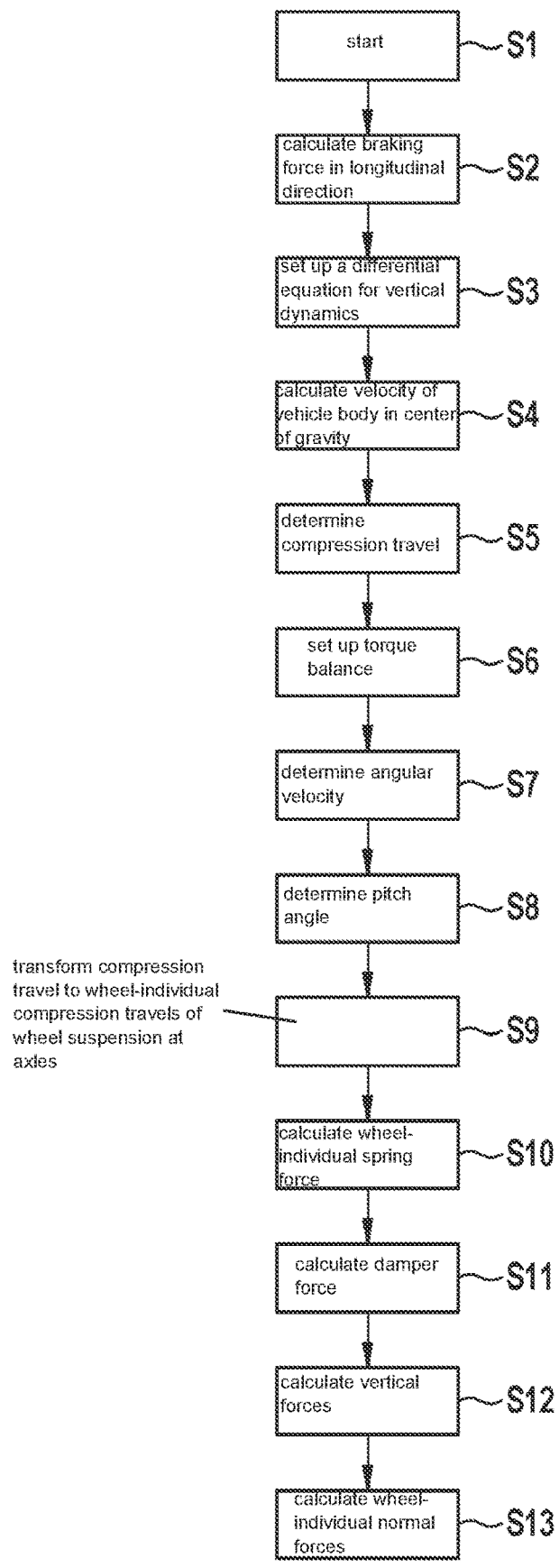
FIG. 3 shows a flow diagram in order to describe an advantageous method for operating a brake system of the motor vehicle, in accordance with an example embodiment of the present invention.

FIG. 2 shows a simplified physical model of motor vehicle 1, which is embodied as a one-track model. In the following text, an advantageous method that ensures that wheel brakes 3 supply the best possible braking power at all times will be described based on the model and the flow diagram shown in FIG. 3. The method is particularly executed by a control unit of the motor vehicle, which includes a non-volatile memory in which the present method is stored in the form of a computer program. The method starts upon the initial operation of the motor vehicle in step S1.

To begin with, in a step S2, braking force Fx in the longitudinal direction is calculated for each wheel with the aid of the moment balance at the respective wheel, which results from the principle of angular acceleration, so that a longitudinal force $F_{xh}$ for the rear wheel according to the single-track model and a longitudinal force $F_{xv}$ for the front wheel are calculated. From the principle of angular acceleration for this particular example, the following results for the wheel on the front left (index: FL=front left, FR=front right, RL=rear left, RR=rear right), for example:

$$\dot{\omega}^{FL} = \frac{-F_x^{FL} \cdot r - M_{br}^{FL} + M_{motor}}{J_{wheel}} \quad (1)$$

With the aid of the known variables such as drive torque $M_{motor}$, the wheel brake pressure, the wheel moment of inertia $J_{wheel}$, the wheel acceleration and drive torque, the brake force in the longitudinal direction is calculated following a rearrangement of the equation (1). Brake torque $M_{br}$ required for the calculation is especially ascertained from the wheel brake pressure and a linear conversion factor cp.

In the next step S3, a differential equation is set up for the vertical dynamics of vehicle body 5 in the vehicle center of gravity S:

$$\ddot{z} = \frac{d(\dot{z})}{dt} = \frac{F_z^{FL} + F_z^{FR} + F_z^{RL} + F_z^{RR}}{m_{Fzg}} - g \cdot \cos(\alpha) \quad (2)$$

As may be gathered from the equation (2), the acceleration of vehicle body 5 in center of gravity S is calculated with the aid of the vertical forces between the vehicle body and wheel. In the process, vertical forces $F_{zh}$, $F_{zv}$ that are acting on the respective wheel are initially assumed as known variables, in particular as the variables calculated in the preceding calculation cycle. Through an integration in step S4, velocity $\dot{z}$ of vehicle body 5 in center of gravity S in the vertical direction is calculated:

$$\dot{z} = \int \ddot{z}(t) \cdot dt \quad (3)$$

A still further integration of the velocity in step S5 yields the compression travel of vehicle body 5 at the center of gravity in comparison with the initial position:

$$z = \int \dot{z}(t) \cdot dt \quad (4)$$

In order to calculate the pitch dynamics of vehicle body 5 in center of gravity S, the torque balance is preferably set up in step S6 via the rotation behavior of vehicle body 5 using a calculation of the principle of the angular momentum:

$$\ddot{\varphi} = \frac{d(\dot{\varphi})}{dt} = \frac{(F_z^{RL} + F_z^{RR}) \cdot l_{rear}^{CG} - (F_z^{FL} + F_z^{FR}) \cdot l_{front}^{CG} -}{J\_Fzg} \frac{(F_x^{FL} + F_x^{FR} + F_x^{RL} + F_x^{RR}) \cdot h^{CG}}{} \quad (5)$$

The differential equation provides angular acceleration $\ddot{\varphi}$ of vehicle body 5. The variables required for this purpose such as braking forces in longitudinal direction $F_{xh}$, $F_{xv}$ already result from the equation (1). The likewise required vertical forces $F_{zh}$, $F_{zv}$ between vehicle body 5 and the wheel are initially assumed as known variables, as in the equation (2), in particular from the preceding cycle.

Analogous to the vertical velocity, an integration of the angular acceleration in step S7 results in angular velocity $\dot{\varphi}$:

$$\dot{\varphi} = \int \ddot{\varphi}(t) \cdot dt \quad (6)$$

A further integration of angular velocity $\dot{\varphi}$ in step S8 results in the pitch angle $\varphi$:

$$\varphi = \int \dot{\varphi}(t) \cdot dt \quad (7)$$

With the aid of pitch angle $\varphi$, in step S9, the transformation of the compression travel in center of gravity S of vehicle body 5 is now transformed to the wheel-individual compression travels of wheel suspension 4 at the axles of motor vehicle 1. The same applies to the compression rate:

$$z^{FL} = z^{FR} = z^{CG} - l_{front}^{CG} \cdot \sin(\varphi^{CG})$$

$$z^{RL} = z^{RR} = z^{CG} - l_{rear}^{CG} \cdot \sin(\varphi^{CG}) \quad (8)$$

$$\dot{z}^{FL} = \dot{z}^{FR} = \dot{z}^{CG} - l_{front}^{CG} \cdot \sin(\varphi^{CG})$$

$$\dot{z}^{RL} = \dot{z}^{RR} = \dot{z}^{CG} - l_{rear}^{CG} \cdot \sin(\varphi^{CG}) \quad (9)$$

Spring force $F_c$ between vehicle body 5 and the wheel, in particular wheel-individual spring force $F_{ch}$, $F_{cv}$, is then calculated in step S10 with the aid of compression travel z and spring stiffness c, in the following manner:

$$F_c^{FL} = -c^{FA} \cdot z^{FL} \quad (8)$$

The calculation for all wheels of the motor vehicle is carried out as shown in equation (8).

In step S11, damper force $F_d$ between the vehicle body and the wheel is calculated, especially individually for each wheel, as damper force $F_{dv}$ and $F_{dh}$ based on spring compression rate $\dot{z}$ and damper constant d:

$$F_d^{FL} = -d^{FA} \cdot \dot{z}^{FL} \quad (9)$$

Here, too, the calculation for all wheels of motor vehicle 1 is carried out in the same way as in the equation (9).

For damper constant d, a distinction can be made between a traction and pressure stage. In addition, it is possible that the damper constant has a non-linear characteristic which is a function of the compression rate. However, this depends on the respective vehicle chassis of motor vehicle 1 and/or respective wheel suspension 4.

In step S12, the vertical forces between vehicle body 5 and respective wheel $F_{zh}$, $F_{zv}$ are subsequently calculated with the aid of the spring and damper forces and the influence of a braking torque compensation that results from the wheel suspension (in the example, from the wheel at the front left (FL)):

$$F_z^{FL} = F_c^{FL} + F_d^{FL} + k_{Mbr}^{FA} \cdot F_x^{FL} \quad (10)$$

This calculation, too, is performed for each wheel of the motor vehicle as shown in equation (10).

The factor of braking torque compensation $k_{Mbr}$ depends on the design of wheel suspension 4 and is preferably calculated as described before.

In step S13, wheel-individual normal forces $F_N$ are subsequently calculated using vertical forces $F_z$ and wheel mass $m_R$:

$$F_N = F_{zv} + m_{vR} \cdot g \quad (11)$$

Equation (11) is used in a similar manner for each wheel of the motor vehicle.

In this way, the normal forces and thus the tire contact forces of the wheel on the road are calculated for each wheel of motor vehicle 1 and supplied to the brake system so that the brake system optimally sets the particular brake forces that achieve the best possible braking power, individually for each wheel.

The invention claimed is:

1. A method for operating a brake system of a motor vehicle, the motor vehicle having a vehicle body and multiple wheels mounted relative to the vehicle body by a wheel suspension on the vehicle body, the vehicle body being capable of executing a pitching movement by the wheel suspension, and the brake system having, for each of at least two of the wheels, a respective wheel brake, the method comprising the following steps:
   monitoring a pitch angle of the vehicle body; and
   for each respective one of the at least two of the wheels:
      based on the pitch angle of the vehicle body determined from the monitoring, determining a respective normal force acting on the respective wheel;
      setting a respective brake force for the respective wheel based on an association of the respective wheel with the respective normal force determined to be acting on the respective wheel; and
      actuating the respective wheel brake of the respective wheel as a function of the respective brake force set for the respective wheel.

2. The method as recited in claim 1, wherein the pitch angle is ascertained using a programmed model, the programmed model being a one-track model.

3. The method as recited in claim 2, wherein the programmed model takes vertical translation movements and rotary movements of the vehicle body into account.

4. The method as recited in claim 3, wherein, for the each respective one of the at least two wheels, the determination of the respective normal force acting on the respective wheel is made additionally based on a braking torque compensation factor, which is a function of the wheel suspension.

5. The method as recited in claim 3, wherein vertical dynamics in a center of gravity of the vehicle body are ascertained to determine the vertical translation movements.

6. The method as recited in claim 5, wherein, as a function of the ascertained vertical dynamics and using a calculation of a principle of angular acceleration, pitching dynamics in the center of gravity of the vehicle body is ascertained as a function of braking forces acting at the wheels in a driving direction.

7. A method for operating a brake system of a motor vehicle, the motor vehicle having a vehicle body and multiple wheels mounted relative to the vehicle body by a wheel suspension on the vehicle body, the vehicle body being capable of executing a pitching movement by the wheel suspension, and the brake system having, for each of at least two of the wheels, a respective wheel brake, the method comprising the following steps:
   ascertaining pitching dynamics in a center of gravity of the vehicle body as a function of ascertained vertical dynamics, a calculation of a principle of angular acceleration, and braking forces acting at the wheels in a driving direction;
   transforming the ascertained vertical dynamics to wheel-individual compression travels of the wheel suspension as a function of the ascertained pitching dynamics; and
   actuating the wheel brakes as a function of the wheel-individual compression travels of the wheel suspension.

8. The method as recited in claim 7, wherein:
   respective wheel-individual vertical forces between each respective wheel and the vehicle body are calculated as a function of the compression travels, a wheel-individual spring force, and a damper force; and
   the actuating is performed as a function of the wheel-individual vertical forces.

9. The method as recited in claim 8, wherein wheel-individual normal forces are calculated as a function of the respective vertical forces and respective wheel masses of the wheels, and the actuating is performed as a function of the wheel-individual normal forces.

10. A non-transitory machine-readable memory medium on which is stored a computer program for operating a brake system of a motor vehicle, the motor vehicle having a vehicle body and multiple wheels mounted relative to the vehicle body by a wheel suspension on the vehicle body, the vehicle body being capable of executing a pitching movement by the wheel suspension, and the brake system having, for each of at least two of the wheels, a respective wheel brake, the computer program, when executed by a computer, causing the computer to perform the following steps:
   monitoring a pitch angle of the vehicle body; and
   for each respective one of the at least two of the wheels:
      based on the pitch angle of the vehicle body determined from the monitoring, determining a respective normal force acting on the respective wheel;
      setting a respective brake force for the respective wheel based on an association of the respective wheel with the respective normal force determined to be acting on the respective wheel; and
      actuating the respective wheel brake of the respective wheel as a function of the respective brake force set for the respective wheel.

11. A device for operating a motor vehicle, the motor vehicle having a vehicle body and multiple wheels mounted relative to the vehicle body via a wheel suspension on the vehicle body, and a brake system, the vehicle body being capable of performing a pitching movement by the wheel suspension, and the brake system having, for each of at least two of the wheels, a respective wheel brake, the device comprising:
   a control unit configured to operate the brake system, the control unit configured to:
      monitor a pitch angle of the vehicle body; and
      for each respective one of the at least two of the wheels:
         based on the pitch angle of the vehicle body determined from the monitoring, determine a respective normal force acting on the respective wheel;
         set a respective brake force for the respective wheel based on an association of the respective wheel with the respective normal force determined to be acting on the respective wheel; and
         actuate the respective wheel brake of the respective wheel as a function of the respective brake force set for the respective wheel.

12. A brake system for a motor vehicle, the motor vehicle having a vehicle body and multiple wheels mounted relative to the vehicle body by a wheel suspension on the vehicle body, the vehicle body being capable of executing a pitching movement by the wheel suspension, wherein the brake system comprises:
   a wheel-individual wheel brake for each of at least two of the wheels; and
   a control unit configured to operate the brake system, the control unit configured to:
      monitor a pitch angle of the vehicle body; and
      for each respective one of the at least two of the wheels:
         based on the pitch angle of the vehicle body determined from the monitoring, determine a respective normal force acting on the respective wheel;
         set a respective brake force for the respective wheel based on an association of the respective wheel with the respective normal force determined to be acting on the respective wheel; and actuate the respective wheel brake of the respective wheel as a function of the respective brake force set for the respective wheel.

* * * * *